12) United States Patent
Kunz et al.

(10) Patent No.: US 10,437,773 B2
(45) Date of Patent: Oct. 8, 2019

(54) SPI DEVICES WITH MULTI-MASTER CAPABILITIES

(71) Applicant: Marvell World Trade Ltd., St. Michael (BB)

(72) Inventors: Manfred Kunz, Rastatt (DE); Markus Fischer, Offenburg (DE)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/984,441

(22) Filed: May 21, 2018

(65) Prior Publication Data

US 2019/0171608 A1   Jun. 6, 2019

Related U.S. Application Data

(60) Provisional application No. 62/594,995, filed on Dec. 5, 2017.

(51) Int. Cl.
G06F 13/364 (2006.01)
G06F 13/42 (2006.01)

(52) U.S. Cl.
CPC ........ G06F 13/4282 (2013.01); G06F 13/364 (2013.01)

(58) Field of Classification Search
None
See application file for complete search history.

(56) References Cited

U.S. PATENT DOCUMENTS

| | | | | |
|---|---|---|---|---|
| 6,857,035 B1* | 2/2005 | Pritchard | ............. | G06F 13/374 700/3 |
| 7,412,556 B2* | 8/2008 | Dong | .................... | G06F 13/364 710/110 |
| 8,626,973 B2* | 1/2014 | Austen | ................ | G06F 13/4291 710/110 |
| 9,003,092 B2* | 4/2015 | Hong | ...................... | G06F 13/00 710/200 |
| 9,804,942 B2* | 10/2017 | Hayden | ............... | G06F 13/4027 |
| 2013/0211552 A1* | 8/2013 | Gomez | .................. | G05B 11/01 700/20 |
| 2015/0378959 A1* | 12/2015 | Jones | .................. | G06F 13/4291 714/5.11 |
| 2016/0140067 A1* | 5/2016 | Gately | .................. | G06F 13/364 710/110 |

OTHER PUBLICATIONS

Motorola Inc., "SPI Block Guide," version 03.06, document No. S12SPIV3/D, 38 pages, Feb. 2003.
Texas Instruments Inc., "Microwire Serial Interface," Application Note AN-452, 14 pages, year 2011.

* cited by examiner

Primary Examiner — Elias Mamo

(57) ABSTRACT

An electronic system includes a slave device, multiple master devices and logic circuitry. The slave device is configured to communicate with a single master device in accordance with a single-master communication protocol. The multiple master devices are respectively configured to communicate with the slave device in accordance with the single-master communication protocol. The logic circuitry, which is disposed respectively in the multiple master devices, is configured to exchange control signals indicative of whether the slave device is available for access, so as to prevent simultaneous access attempts to the slave device by more than one of the master devices.

8 Claims, 4 Drawing Sheets

SPI DEVICES WITH MULTI-MASTER CAPABILITIES

CROSS-REFERENCE TO RELATED APPLICATIONS

This application claims the benefit of U.S. Provisional Patent Application 62/594,995, filed Dec. 5, 2017, whose disclosure is incorporated herein by reference.

FIELD OF THE DISCLOSURE

The present disclosure relates generally to communication between electronic devices, and particularly to methods and systems for multi-master communication.

BACKGROUND

Various communication protocols have been specified for communication between electronic devices. One example protocol is the Serial Peripheral Interface (SPI) bus. SPI devices communicate in full duplex mode using a master-slave architecture with a single master. The SPI architecture and protocol are specified, for example, in "SPI Block Guide," version 03.06, Motorola, Inc., document number S12SPIV3/D, February, 2003.

The description above is presented as a general overview of related art in this field and should not be construed as an admission that any of the information it contains constitutes prior art against the present patent application.

SUMMARY

An embodiment that is described herein provides an electronic system including a slave device, multiple master devices and logic circuitry. The slave device is configured to communicate with a single master device in accordance with a single-master communication protocol. The multiple master devices are respectively configured to communicate with the slave device in accordance with the single-master communication protocol. The logic circuitry, which is disposed respectively in the multiple master devices, is configured to exchange control signals indicative of whether the slave device is available for access, so as to prevent simultaneous access attempts to the slave device by more than one of the master devices.

In some embodiments, the electronic system further includes an arbiter configured to arbitrate requests from the master devices to access the slave device, and the logic circuitry in each master device among the multiple master devices is configured to issue a request to the arbiter and to enable access to the slave device only if the request is granted by the arbiter.

In an example embodiment, the single-master communication protocol specifies Chip-Select (CS) signals for selecting respective slave devices by a single master, and the logic circuitry of a respective master device is configured request the arbiter to access the slave device by asserting a CS signal corresponding to the slave device. In a disclosed embodiment, the CS signal corresponding to the slave device is connected between the respective master device and the arbiter, not between the respective master device and the slave device.

In some embodiments, the logic circuitry in a respective master device among the multiple master devices includes (i) an output interface for signaling that the master device is currently accessing the slave device, and (ii) an input interface for receiving signaling that another master device is currently accessing the slave device. In an embodiment, the output interface of each master device is connected to the input interface of each of the other master devices. In an embodiment, the logic circuitry in each master device is configured to access the slave device only in response to ascertaining, using the input interface, that no other master device is currently accessing the slave device.

There is additionally provided, in accordance with an embodiment that is described herein, a method for accessing a slave device by multiple master devices. The method includes communicating between the slave device and the multiple master devices using a single-master communication protocol. Simultaneous access attempts to the slave device by more than one of the master devices are prevented by exchanging, among logic circuitry disposed respectively in the multiple master devices, control signals indicative of whether the slave device is available for access.

The present disclosure will be more fully understood from the following detailed description of the embodiments thereof, taken together with the drawings in which:

DETAILED DESCRIPTION OF EMBODIMENTS

Figure 1:
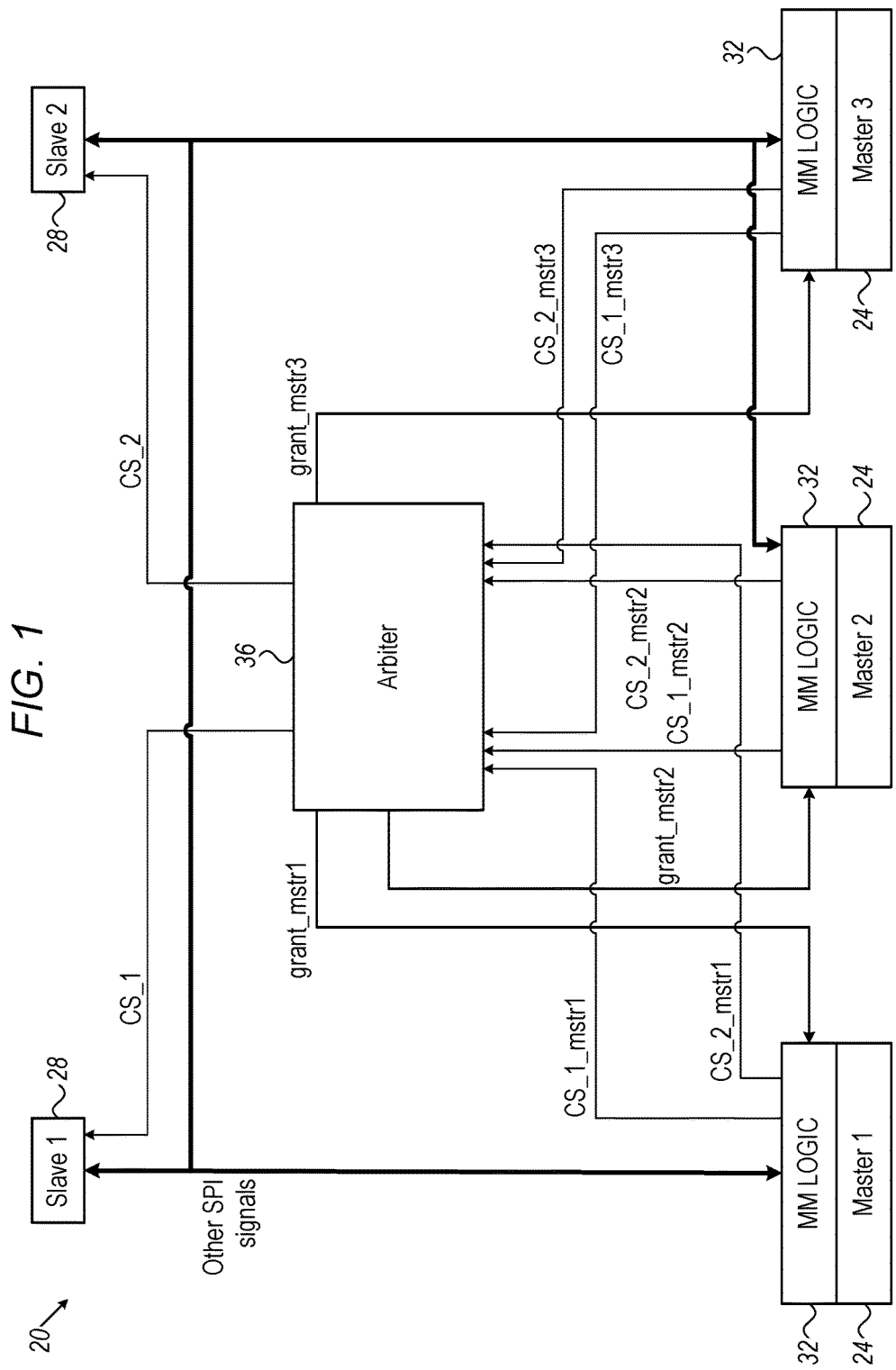
FIG. 1 is a block diagram that schematically illustrates an SPI-based multi-master electronic system, in accordance with an embodiment that is described herein.

Some communication protocols, one example being the SPI protocol, are single-master protocols. A single-master protocol is by-definition designed to support only a single master device and has no provisions for enabling multiple master devices access a slave device. In some cases, however, multi-master capability is highly desirable.

For example, in some electronic systems multiple master devices retrieve their software code or firmware image from a serial Flash memory on power-up, using SPI. Multi-master capability would enable a single serial Flash memory to hold the software and/or firmware for two or more, or even all, the master devices, thereby reducing system size and cost.

Embodiments that are described herein provide methods and systems for enabling multiple master devices to access one or more slave devices, even though the master and slave devices communicate in accordance with a single-master communication protocol.

The embodiments described herein refer mainly to the SPI bus, by way of example. Alternatively, however, the disclosed techniques are applicable in a similar manner to other suitable single-master communication protocols. One example of such a protocol is the Microwire protocol, which is specified, for example, in "Microwire Serial Interface," Texas Instruments, Inc., Application Note AN-452, 2011.

Various variants of the SPI protocol specify different names for the signals exchanged between a master and a slave. In various embodiments, the signals comprise a serial clock signal (sometimes denoted SCK or SCLK), one or more serial data signals from master to slave (sometimes denoted MOSI, SIMO, SIO0, SDI, DI, DIN, SI or MTSR), one or more serial data signals from slave to master (sometimes denoted MISO, SOMI, SIO1, SDO, DO, DOUT, SO or MRST) and one or more Chip-Select (CS) signals (sometimes denoted SS, SSEL or CE). SPI signals may also comprise a write-protect signal (sometimes denoted SIO2) and a hold signal (sometimes denoted SIO3). The description that follows refers to the signals other than CS signals (e.g., serial clock and data signals) collectively as "other SPI signals."

The description that follows refers mainly to "a slave device" for simplicity of explanation. In some embodiments, however, the slave device is one of multiple slave devices. Thus, the techniques described herein are applicable both to system configurations having a single slave device, and to system configurations having a plurality of slave devices.

In some embodiments, an electronic system comprises a slave device and multiple master devices. Each of the master devices comprises Multi-Master (MM) logic circuitry, also referred to as MM logic for brevity. The MM logic circuitries in the various master devices are configured to exchange control signals that are indicative of whether or not the slave device is currently available for access. In this manner, the MM logic circuitries prevent simultaneous access attempts to the slave device by more than one of the master devices.

In an embodiment, the system further comprises an arbiter that is configured to arbitrate requests from the master devices to access the slave device. Each master device comprises a Chip-Select (CS) line that, in accordance with the single-master communication protocol, asserts a CS signal that selects the slave device. Contrary to the specified use of CS signals in the SPI protocol, in the disclosed embodiment the CS lines of the various master devices are connected to the arbiter, not to the slave device. The MM logic in each master device uses the respective CS signal for requesting the arbiter to grant access to the slave device. A master device accesses the slave device only upon receiving a grant from the arbiter.

In another embodiment, the MM logic circuitries in the various master devices exchange the control signals with one another, without a need for a centralized arbiter. The MM logic in each master device comprises (i) an output interface denoted "access" for signaling that the master device is currently accessing the slave device, and (ii) an input interface denoted "ext*_access" for receiving signaling that another master device is currently accessing the slave device. The output interface of each master device is connected to the input interfaces of the other master devices. The MM logic in each master device is configured to access the slave device only upon ascertaining, using its input interface, that no other master device is currently accessing the slave device.

In some embodiments, the disclosed techniques are implemented entirely in the master devices, with the possible addition of an arbiter. In these embodiments the slave device is unaware of the fact that it is being accessed by multiple different master devices. As such, the disclosed techniques can be used with conventional slave devices operating in accordance with the single-master protocol, without requiring any change or adaptation.

FIG. 1 is a block diagram that schematically illustrates an SPI-based multi-master electronic system 20, in accordance with an embodiment that is described herein. System 20 comprises multiple master devices 24 and one or more slave devices 28, which operate in accordance with the SPI protocol.

In the present example system 20 comprises three master devices 24 denoted "Master 1"-"Master 3" and two slave devices 28 denoted "Slave 1" and "Slave 2". Generally, any other suitable numbers of master devices 24 and slave devices 28 can be used.

By definition, the SPI protocol is a single-master communication protocol, i.e., a communication protocol that is specified to support only a single master device (accessing one or more slave devices). SPI has no provisions for enabling multiple master devices to access the slave device or devices. Nevertheless, in the example of FIG. 1, system 20 enables any of masters 24 to access any of slaves 28.

In the present example, system 20 further comprises an arbiter circuit 36, referred to as "arbiter" for brevity. Arbiter 36 receives requests from masters 24 to access slaves 28, and grants access in a manner that prevents multiple masters from accessing the same slave simultaneously.

Masters 24, slaves 28 and arbiter 36 exchange various signals over respective lines. The terms "lines" and "signals" are used interchangeably throughout the description that follows.

In the embodiment of FIG. 1, each master 24 comprises a respective MM logic 32. MM logic 32 of each master 24 comprises a Chip Select (CS) line per slave 28. For example, the CS line used by "master 1" to select "slave 2" is denoted CS_2_mstr1.

Conventionally, a chip select signal is used by a master for selecting a slave to be accessed. In other words, the conventional usage of the CS signal is for deterministic, immediate selection of a slave device. Conventionally, a CS signal is connected directly between a master and a slave.

Contrary to the conventional interconnection and use of CS signals, in the present embodiment the CS lines connect masters 24 to arbiter 36 (rather than connecting any master 24 to any slave 28 directly). Moreover, in the present embodiment the CS signals are used by masters 24 as "arbitration request" or "access request" signals. MM logic 32 in a given master 24 requests arbiter 36 to access a certain slave 28 by asserting the corresponding CS signal. In other words, each master in the present embodiment uses the CS signals not for deterministic, immediate selection of a slave device, but as a request for access that may be granted or denied.

In addition, MM logic 32 in each master 24 is connected to arbiter 36 by a respective "grant" line. The grant line of "Master 1", for example, is denoted "grant_mstr1" in the figure. Arbiter 36 grants access to a certain master 24 (in response to a request issued by the master using the CS signal) by asserting the grant signal. A master 24 is only permitted to drive the other SPI lines after it receives a grant from arbiter 36.

Arbiter 36 is also connected to each slave using a respective CS line. The CS line connecting arbiter 36 to "Slave 1", for example, is denoted "CS_1" in the figure. Upon granting a certain master 24 access to a certain slave 28, arbiter 36 asserts the CS line of that slave until the transaction between the master and the slave is completed.

The other SPI lines (e.g., serial clock and data) are connected directly between masters 24 and slaves 28. In alternative embodiments, two (or more) different masters 24 are able to access respective different slaves 28 simultaneously. In one example embodiment, a separate set of the "other SPI signals" connects each master 24 to each slave

28. In another example embodiment, the "other SPI signals" are connected via arbiter 36 and undergo arbitration.

Figure 2:
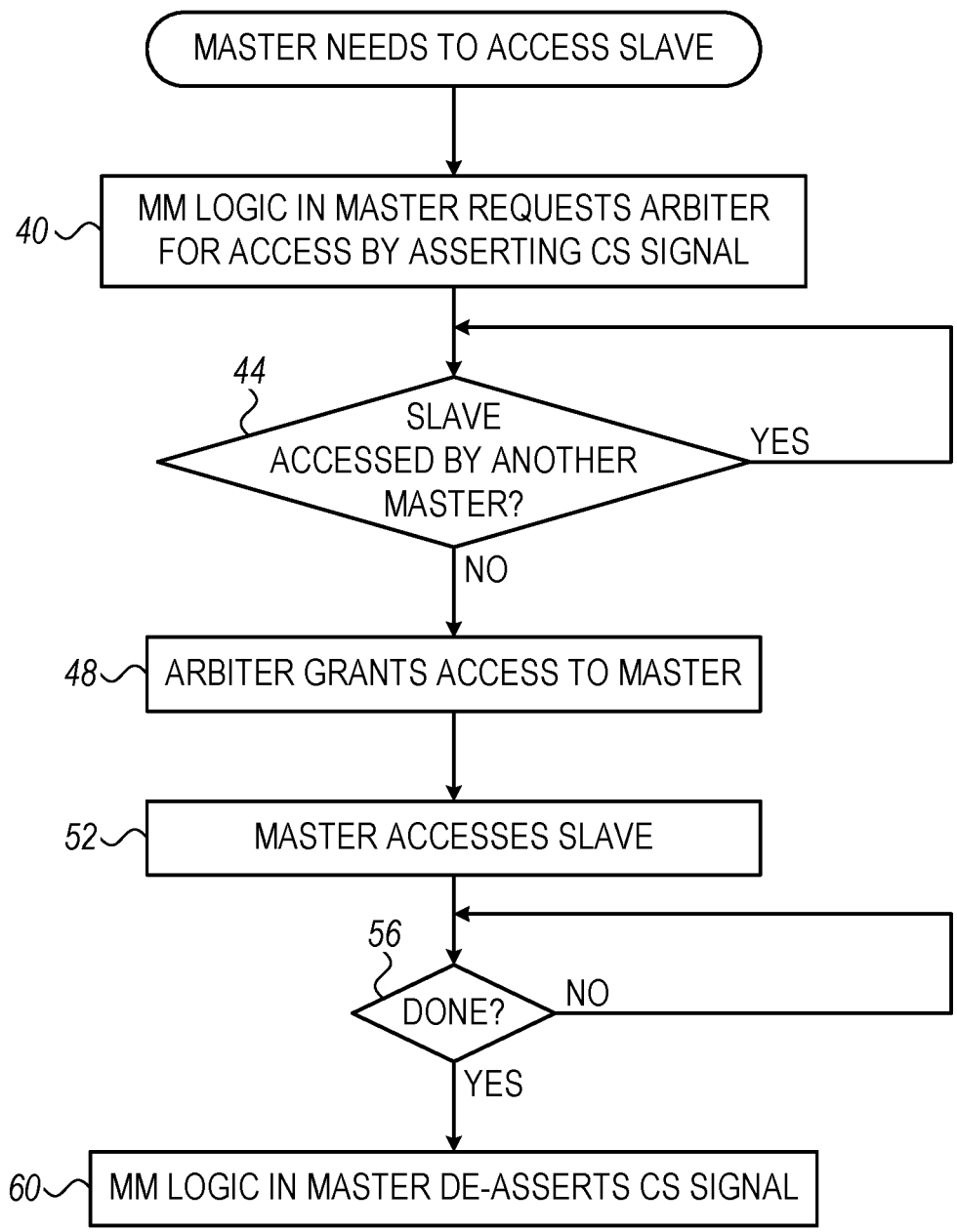
FIG. 2 is a flow chart that schematically illustrates a method for accessing an SPI slave by multiple SPI masters in the system of FIG. 1, in accordance with an embodiment that is described herein.

FIG. 2 is a flow chart that schematically illustrates a method for accessing an SPI slave by multiple SPI masters in system 20 of FIG. 1, in accordance with an embodiment that is described herein. For simplicity of explanation, the method description refers to an example scenario in which "Master 3" attempts to access "Slave 2". Access by any other master to any other slave is performed in a similar manner.

The method begins with MM logic 32 of "Master 3" requesting arbiter 36 for access to "Slave 2", by asserting the CS_2_mstr3 signal, at an access request operation 40.

At an arbitration checking operation 44, arbiter 36 checks whether "Slave 2" is currently accessed by another master 24. If so, arbiter 36 refrains from granting "Master 3" access to "Slave 2" until "Slave 2" is available for access.

Upon detecting that "Slave 2" is no longer being accessed by any other master 24, arbiter 36 grants "Master 3" access to "Slave 2", at a granting operation 48, by (i) asserting the grant_mstr3 signal toward "Master 3" and (ii) asserting the CS_2 signal toward "Slave 2".

At an access operation 52, "Master 3" accesses "Slave 2" using the other SPI signals. At a completion checking operation 56, MM logic 32 of "Master 3" continually checks whether the transaction with "Slave 2" is completed. Once completed, MM logic 32 of "Master 3" de-asserts the CS_2_mstr3 signal toward arbiter 36. In response, arbiter 36 de-asserts the CS_2 signal toward "Slave 2" and the method terminates.

In the example above, the CS signals are used to govern whether a certain slave 28 is available for access by a certain master 24. Access is granted or denied by arbiter 36. The actual memory access transactions, once granted, are carried out over the other SPI signals, separate from the CS signals.

Figure 3:
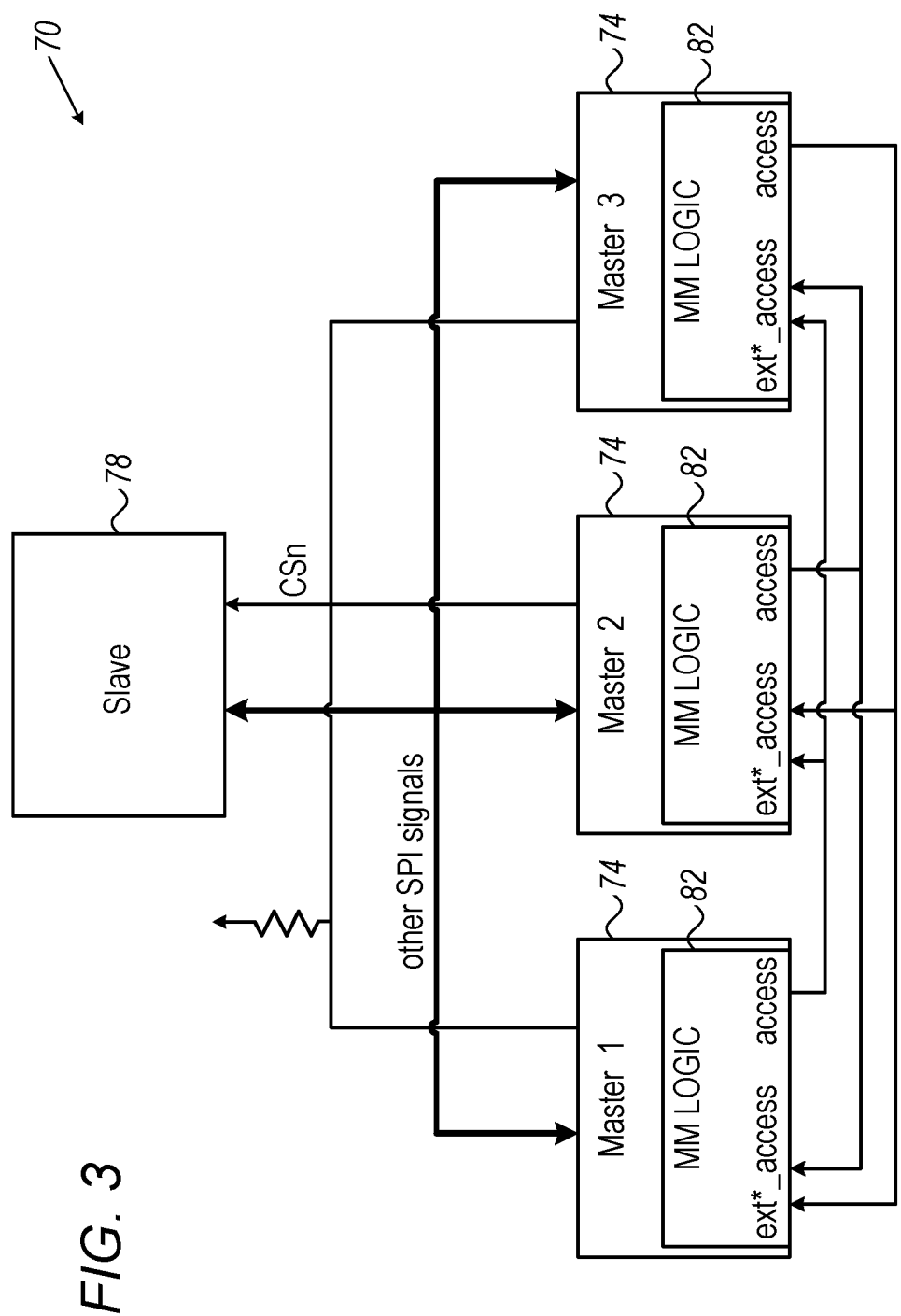
FIG. 3 is a block diagram that schematically illustrates an SPI-based multi-master electronic system, in accordance with another embodiment that is described herein.

FIG. 3 is a block diagram that schematically illustrates an SPI-based multi-master electronic system 70, in accordance with another embodiment that is described herein. In contrast to system 20 of FIG. 1 above, in system 70 of FIG. 3 the arbitration between masters is distributed and does not require any centralized arbiter, by virtue of signaling exchanged directly among the MM logic in the various master devices.

System 70 comprises multiple master devices 74 and one or more slave devices 78, which operate in accordance with the SPI protocol. In the present example system 70 comprises three master devices 74 denoted "Master 1"-"Master 3" and a single slave device 28. Generally, however, any other suitable numbers of master devices 74 and slave devices 78 can be used.

In the embodiment of FIG. 3, each master 74 comprises a respective MM logic 82. MM logic 82 of each master 74 comprises an output interface denoted "access" for signaling that master 74 is currently accessing slave 78. MM logic 82 of each master 74 further comprises an input interface denoted "ext*_access" for receiving signaling that another master 74 is currently accessing slave 78.

The "access" (output) interface of each master 74 is connected to the "ext*_access" (input) interfaces of the other masters 74. Typically, a certain master 74 will only access slave 78 after ascertaining (using its "ext*_access" interface) that no other master is currently accessing the slave. Upon beginning to access the slave, the master will typically assert its "access" interface in order to prevent other masters from attempting to access the slave at the same time.

In the configuration of FIG. 3, the CS signals of the multiple masters 74 (denoted CSn in the figure) are connected in parallel to the CS input of slave 78. In this manner, and master 74 is able to select slave 78 by asserting the CS signal. The other SPI signals (e.g., serial clock and data) are also connected in parallel between masters 74 and slave 78.

Figure 4:
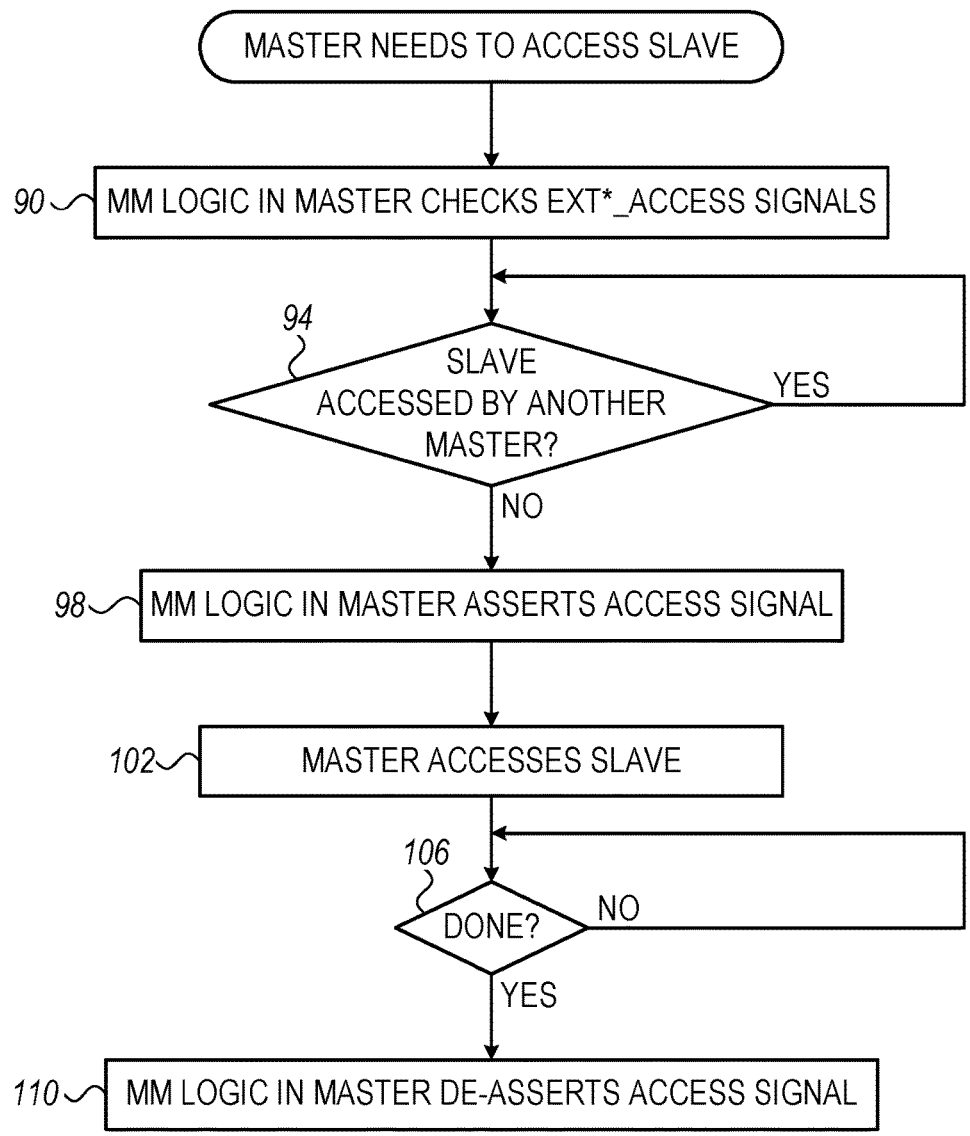
FIG. 4 is a flow chart that schematically illustrates a method for accessing an SPI slave by multiple SPI masters in the system of FIG. 3, in accordance with an embodiment that is described herein.

FIG. 4 is a flow chart that schematically illustrates a method for accessing an SPI slave by multiple SPI masters in system 70 of FIG. 3, in accordance with an embodiment that is described herein.

For simplicity of explanation, the method description refers to an example scenario in which "Master 3" attempts to access slave 78. Access by any other master is performed in a similar manner.

The method begins with MM logic 82 of "Master 3" checking its "ext*_access" input interfaces from "Master 1" and "Master 2", at an input checking operation 90. At an access checking operation 94, MM logic 82 of "Master 3" checks whether the "ext*_access" input interfaces indicate that another master is currently accessing the slave. If so, MM logic 82 of "Master 3" remains at operation 94 until all the "ext*_access" input interfaces are de-asserted, meaning that the slave is available for access.

Once ascertaining that slave 78 is not being accessed by another master, MM logic 82 of "Master 3" asserts its "access" output interface, at an access asserting operation 98. This signal appears at the "ext*_access" input interfaces of the other masters, and prevents them from attempting to access the slave. In addition, MM logic 82 of "Master 3" asserts its CS signal toward slave 78.

At this stage, MM logic 82 of "Master 3" still retains its other SPI signals in tri-state, and continues to sense the "ext*_access" input interfaces for a predefined time period. If another master attempts to access slave 78 during the predefined time period, both masters will detect this situation by sensing their "ext*_access" input interfaces.

In one embodiment, if one of the masters asserts the CS signal but then detects (on the "ext*_access" input interfaces) that another master is also attempting to access slave 78, the master immediately de-asserts both the CS signal and "access" signal. In an embodiment, each of the masters detecting this collision then waits for a random time interval before reattempting to access slave 78. In other embodiments, other methods of resolving collision can be used.

If no other master accesses the slave during this time period, "Master 3" begins to access slave 78 using the other SPI signals, at an access operation 102. At a completion checking operation 106, MM logic 82 of "Master 3" continually checks whether the transaction with slave 78 is completed. Once completed, MM logic 82 of "Master 3" de-asserts the "access" output interface, as well as its CS signal, and the method terminates.

The configurations of systems 20 and 70 and their components, e.g., master devices 24 and 74, slave devices 28 and 78, and arbiter 36, as shown in FIGS. 1 and 3, are example configurations that are depicted solely for the sake of clarity. In alternative embodiments, any other suitable configurations can be used. Elements that are not mandatory for understanding of the disclosed techniques have been omitted from the figures for the sake of clarity.

Masters 24 and 74, and slaves 28 and 78, may comprise any suitable types of electronic devices or circuits. In one example embodiment, two or more masters comprise communication packet switches used in a packet network, e.g., an Ethernet network, and a slave comprises a serial Flash memory device. In this embodiment, the serial Flash memory device (slave) stores the software code and/or firmware image of the switches (masters).

In another example embodiment, slaves 28 or 78 may comprise intelligent devices such as Multipoint Control Units (MCUs) or bridge devices (e.g., from SPI to Universal Serial Bus (USB), or from SPI to Peripheral Component Interconnect Express (PCIe)). In this embodiment, each such intelligent slave can be utilized by multiple masters 24 or 74. In an embodiment in which a slave comprises a bridge device, for example, each master 24 or sends and receives data, e.g. from/to a host. In an embodiment in which a slave comprises an MCU, the MCU serves as a central point for masters 24 or 74 to communicate with one another. Further alternatively, the disclosed techniques are applicable to various other systems and use cases.

The different elements of systems 20 and 70 may be implemented using dedicated hardware or firmware, such as using hard-wired or programmable logic, e.g., in an Application-Specific Integrated Circuit (ASIC) or Field-Programmable Gate Array (FPGA). In some embodiments, certain system elements, for example elements of arbiter 36, MM logic 32 and/or MM logic 82, is implemented in one or more programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An electronic system, comprising:
    a slave device, configured to communicate with a single master device in accordance with a single-master communication protocol;
    multiple master devices respectively configured to communicate with the slave device in accordance with the single-master communication protocol; and
    logic circuitry disposed respectively in the multiple master devices, the logic circuitry in each master device comprising:
        an input interface, configured to receive signaling indicating that another master device is currently accessing the slave device; and
        an output interface connected to the input interface of each of the other master devices, the output interface configured to send to the other master devices the signaling indicating that the master device is currently accessing the slave device.

2. The electronic system according to claim 1, wherein the logic circuitry in each master device is configured to access the slave device only in response to ascertaining, using the input interface, that no other master device is currently accessing the slave device.

3. A method for accessing a slave device by multiple master devices, the method comprising:
    communicating between the slave device and the multiple master devices using a single-master communication protocol; and
    preventing simultaneous access attempts to the slave device by more than one of the master devices, using logic circuitry disposed respectively in the multiple master devices, by performing in the logic circuitry in each master device:
    receiving, via an input interface, signaling indicating that another master device is currently accessing the slave device; and
    sending to the other master devices, via an output interface connected to the input interface of each of the other master devices, the signaling indicating that the master device is currently accessing the slave device.

4. The method according to claim 3, wherein preventing the simultaneous access attempts comprises, in the logic circuitry in each master device, accessing the slave device only in response to ascertaining, using the input interface, that no other master device is currently accessing the slave device.

5. The electronic system according to claim 1, further comprising a Chip-Select (CS) line, a clock line and one or more data lines that are connected in parallel among the multiple master devices and the slave device.

6. The electronic system according to claim 1, wherein the logic circuitry in each master device is configured, in response to accessing the slave device and detecting a simultaneous attempt by another master device to access the slave device, to re-attempt accessing the slave device after a random time interval.

7. The method according to claim 3, wherein a Chip-Select (CS) line, a clock line and one or more data lines are connected in parallel among the multiple master devices and the slave device.

8. The method according to claim 3, wherein preventing the simultaneous access attempts comprises, in the logic circuitry in each master device, in response to accessing the slave device and detecting a simultaneous attempt by another master device to access the slave device, re-attempting accessing the slave device after a random time interval.

* * * * *